(12) United States Patent
Sobran et al.

(10) Patent No.: US 11,288,065 B2
(45) Date of Patent: Mar. 29, 2022

(54) DEVOPS DRIVEN COGNITIVE COST FUNCTION FOR SOFTWARE DEFECT PREDICTION

(71) Applicant: International Business Machines Corporation, Armonk, NY (US)

(72) Inventors: Alexander Sobran, Chapel Hill, NC (US); Yogesh Rane, Raleigh, NC (US); Bo Zhang, Cary, NC (US); Guilherme Ferreira, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 16/025,242

(22) Filed: Jul. 2, 2018

(65) Prior Publication Data

US 2020/0004532 A1 Jan. 2, 2020

(51) Int. Cl.
G06F 8/77 (2018.01)
G06N 5/04 (2006.01)
G06N 20/00 (2019.01)

(52) U.S. Cl.
CPC ............... G06F 8/77 (2013.01); G06N 5/04 (2013.01); G06N 20/00 (2019.01)

(58) Field of Classification Search
None
See application file for complete search history.

(56) References Cited

U.S. PATENT DOCUMENTS

| 6,477,471 B1 | 11/2002 | Hedstrom et al. |
| 9,619,363 B1 | 4/2017 | Chitale et al. |
| 2005/0071807 A1 | 3/2005 | Yanavi |

(Continued)

FOREIGN PATENT DOCUMENTS

WO 2017/194281 A1 11/2017

OTHER PUBLICATIONS

T. Bakota, P. Hegedus, G. Ladányi, p. Körtvélyesi, R. Ferenc and T. Gyimóthy, "A cost model based on software maintainability," 2012 28th IEEE International Conference on Software Maintenance (ICSM), 2012, pp. 316-325, doi: 10.1109/ICSM.2012.6405288. (Year: 2012).*

(Continued)

*Primary Examiner* — Andrew M. Lyons
(74) *Attorney, Agent, or Firm* — Robert J. Shatto; Madeline F. Schiesser; Keohane & D'Alessandro, PLLC

(57) ABSTRACT

Approaches presented herein enable domain knowledge-based software defect prediction. More specifically, a cost function configured to train a machine learning model to predict a defect in a software version is obtained. A domain knowledge penalty metric is then determined for a software development team associated with the software version. A linear combination of the determined domain knowledge penalty metric is then applied to the obtained cost function to create a domain knowledge-modified cost function. Using this domain knowledge-modified cost function, the machine learning model is then trained based on a minimization of the domain knowledge-modified cost function. Once trained, the machine learning model is used to report a set of predicted values based on the domain knowledge-modified cost function trained machine learning model.

20 Claims, 5 Drawing Sheets

(56) References Cited

U.S. PATENT DOCUMENTS

| | | | |
|---|---|---|---|
| 2014/0053135 A1* | 2/2014 | Bird | G06F 8/71 717/124 |
| 2015/0082277 A1* | 3/2015 | Champlin-Scharff | G06F 8/70 717/120 |
| 2015/0135166 A1* | 5/2015 | Tarlow | G06F 8/75 717/125 |
| 2017/0192880 A1 | 7/2017 | Ramakrishnan et al. | |
| 2017/0235569 A1* | 8/2017 | Sturtevant | G06Q 10/06393 717/102 |
| 2017/0262360 A1 | 9/2017 | Kochura et al. | |
| 2018/0034859 A1 | 2/2018 | Aronowitz et al. | |
| 2018/0275970 A1* | 9/2018 | Woulfe | G06N 3/0445 |
| 2019/0391904 A1* | 12/2019 | Sabharwal | G06F 8/65 |

OTHER PUBLICATIONS

R. C. Barros, D. D. Ruiz, N. N. Tenorio Jr., M. P. Basgalupp and K. Becker, "Issues on Estimating Software Metrics in a Large Software Operation," 2008 32nd Annual IEEE Software Engineering Workshop, 2008, pp. 152-160, doi: 10.1109/SEW.2008.22. (Year: 2008).*

R. Moser, W. Pedrycz and G. Succi, "A comparative analysis of the efficiency of change metrics and static code attributes for defect prediction," 2008 ACM/IEEE 30th International Conference on Software Engineering, 2008, pp. 181-190, doi: 10.1145/1368088. 1368114. (Year: 2008).*

P. Deep Singh and A. Chug, "Software defect prediction analysis using machine learning algorithms," 2017 7th International Conference on Cloud Computing, Data Science & Engineering—Confluence, 2017, pp. 775-781, doi: 10.1109/CONFLUENCE.2017. 7943255. (Year: 2017).*

Shi Zhong, T. M. Khoshgoftaar and N. Seliya, "Unsupervised learning for expert-based software quality estimation," Eighth IEEE International Symposium on High Assurance Systems Engineering, 2004. Proceedings., 2004, pp. 149-155, doi: 10.1109/HASE.2004. 1281739. (Year: 2004).*

Thilo Mende et al., "Effort-Aware Defect Prediction Models", http://maroon.cs.queensu.ca/home/ahmed/home/teaching/CISC880/F10/papers/EffortAware_CSMR2010.pdf, 2010 14th European Conference on Software Maintenance and Reengineering, Mar. 15-18, 2010, 10 pages.

* cited by examiner $$M_{ce}(y, \hat{y}(\beta)) = -\sum_{i=1}^{n} [y_i \log(\hat{y}_i(\beta)) + (1 - y_i) \log(1 - \hat{y}_i(\beta))] \quad (1)$$

$$MH(y, \hat{y}(\beta)) = M(y, \hat{y}(\beta)) + \sum_{j=1}^{m} \sum_{i=1}^{n} [H_j(y_i, \hat{y}_i(\beta), p_j)] \quad (2)$$

$$\beta := \beta - \gamma \frac{\partial MH(y, \hat{y}(\beta))}{\partial \beta} \quad (3)$$

FIG. 3

$$MH(y, \hat{y}(\beta), \alpha) = M(y, \hat{y}(\beta)) + \sum_{j=1}^{m} \sum_{i=1}^{n} [H_j(y_i, \hat{y}_i(\beta), \alpha_j, p_j)] \quad (4)$$

$$\alpha := \alpha - \gamma \frac{\partial MH(y, \hat{y}(\beta), \alpha)}{\partial \alpha} \quad (5)$$

$$\beta := \beta - \gamma \frac{\partial MH(y, \hat{y}(\beta), \alpha)}{\partial \beta} \quad (6)$$

FIG. 4

DEVOPS DRIVEN COGNITIVE COST FUNCTION FOR SOFTWARE DEFECT PREDICTION

TECHNICAL FIELD

The present invention relates generally to software defect prediction and, more specifically, to optimizing a software defect prediction machine learning model based on domain knowledge during the training phase.

BACKGROUND

Software defect prediction involves predicting the defect likelihood of a file at a particular version of the software. This is generally done by extracting a set of features from software artifacts and building a cross-sectional training dataset using a history of defects. This cross-sectional dataset is then used to train traditional machine learning algorithms/models, such as logistic regressions or decision trees, to detect a likelihood of a defect. Generally, a machine learning model can be so trained by using a cost function to optimize performance of the model. This optimized performance, however, is based on gradients calculated by the cost function for the performance of the model for only a given training dataset. As new test data is generated, the trained machine learning algorithm/model then predicts whether the test data is defective or not defective. These predictions are then used to focus code reviews or to gate releases.

SUMMARY

Approaches presented herein enable domain knowledge-based software defect prediction. More specifically, a cost function configured to train a machine learning model to predict a defect in a software version is obtained. A domain knowledge penalty metric is then determined for a software development team associated with the software version. A linear combination of the determined domain knowledge penalty metric is then applied to the obtained cost function to create a domain knowledge-modified cost function. Using this domain knowledge-modified cost function, the machine learning model is then trained based on a minimization of the domain knowledge-modified cost function. Once trained, the machine learning model is used to report a set of predicted values based on the domain knowledge-modified cost function trained machine learning model.

One aspect of the present invention includes a method for domain knowledge-based software defect prediction, the method comprising: obtaining a cost function configured to train a machine learning model to predict a defect in a software version; determining a domain knowledge penalty metric for a team associated with the software version; applying a linear combination of the domain knowledge penalty metric to the cost function to create a domain knowledge-modified cost function; training the machine learning model based on the domain knowledge-modified cost function; and reporting a set of predicted values based on the domain knowledge-modified cost function trained machine learning model.

Another aspect of the present invention includes a computer system for domain knowledge-based software defect prediction, the computer system comprising: a memory medium comprising program instructions; a bus coupled to the memory medium; and a processor, for executing the program instructions, coupled to a domain knowledge-based software defect prediction engine via the bus that when executing the program instructions causes the system to: obtain a cost function configured to train a machine learning model to predict a defect in a software version; determine a domain knowledge penalty metric for a team associated with the software version; apply a linear combination of the domain knowledge penalty metric to the cost function to create a domain knowledge-modified cost function; train the machine learning model based on the domain knowledge-modified cost function; and report a set of predicted values based on the domain knowledge-modified cost function trained machine learning model.

Yet another aspect of the present invention includes a computer program product for domain knowledge based software defect prediction, the computer program product comprising a computer readable hardware storage device, and program instructions stored on the computer readable hardware storage device, to: obtain a cost function configured to train a machine learning model to predict a defect in a software version; determine a domain knowledge penalty metric for a team associated with the software version; apply a linear combination of the domain knowledge penalty metric to the cost function to create a domain knowledge-modified cost function; train the machine learning model based on the domain knowledge-modified cost function; and report a set of predicted values based on the domain knowledge-modified cost function trained machine learning model.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 3 shows an example of a set of equations for training a machine learning model to predict a defect in a software version according to illustrative embodiments.

FIG. 4 shows another example of a set of equations for training a machine learning model to predict a defect in a software version according to illustrative embodiments.

Figure 1:
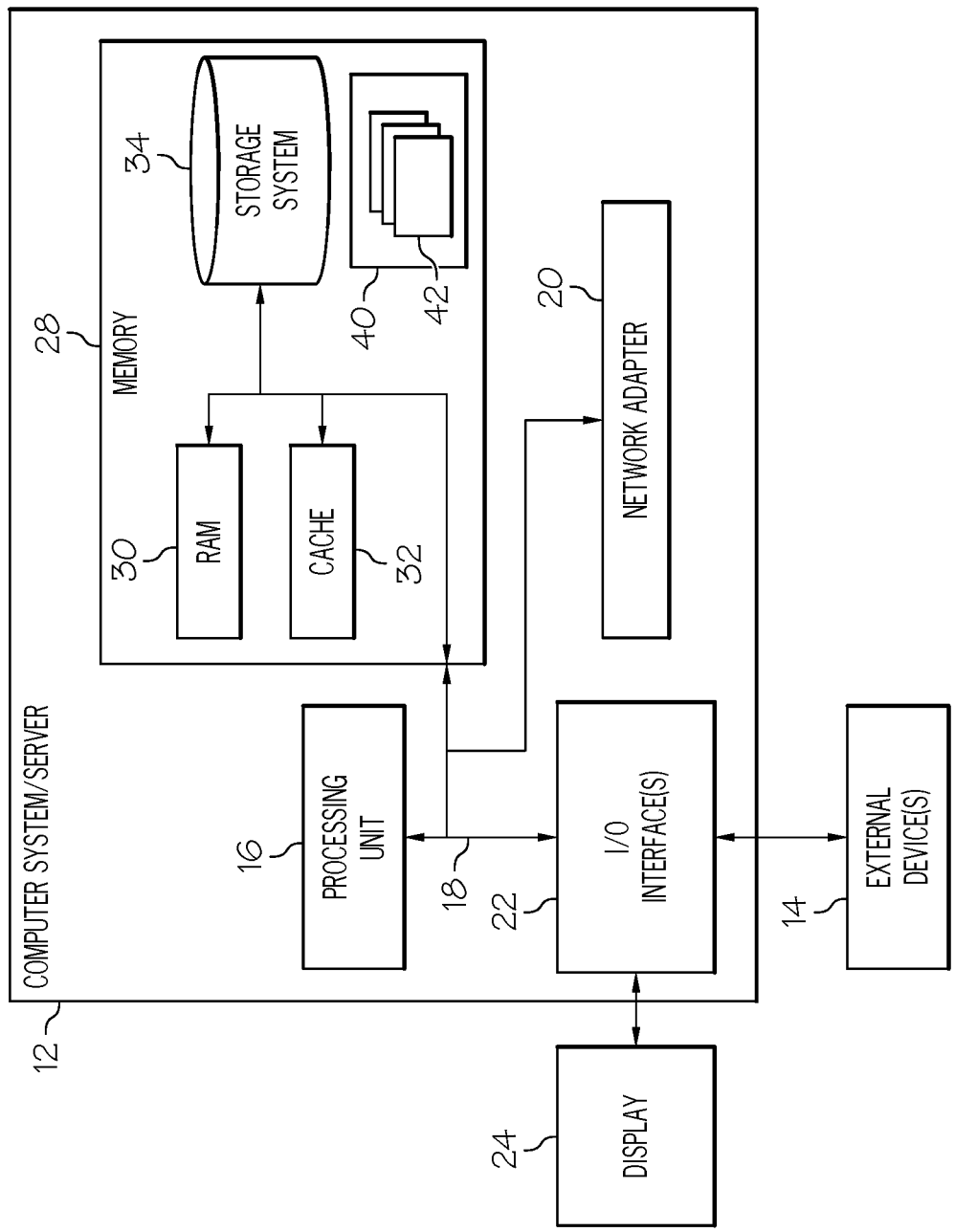
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for domain knowledge-based software defect prediction. More specifically, a cost function configured to train a machine learning model to predict a defect in a software version is obtained. A domain knowledge penalty metric is then determined for a software development team associated with the software version. A linear combination of the determined domain knowledge penalty metric is then applied to the obtained cost function to create a domain knowledge-modified cost function. Using this domain knowledge-modified cost function, the machine learning model is then trained based on a minimization of the domain knowledge-modified cost function. Once trained, the machine learning model is used to report a set of predicted values based on the domain knowledge-modified cost function trained machine learning model.

Referring now to FIG. 1, a computerized implementation 10 of an embodiment for domain knowledge-based software defect prediction will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for domain knowledge-based software defect prediction. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for domain knowledge-based software defect prediction, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that existing cost functions are traditional machine learning-based cost functions used to calculate gradients for training of machine learning models, but only take into account the performance of the selected machine learning model for given a training dataset. For example, IBM DevOps Insights uses machine learning techniques in order to predict whether a particular file is defective or not. (All trademarks and trade names used herein are the property of their respective owners and are used for illustrative and descriptive purposes only.) Although cost effectiveness—a model evaluation metric that can rank file defective predictions by the size of the file, therefore generally indicating that smaller files are more cost effective to review than larger files—can be used to select a machine learning model for subsequent training, cost effectiveness is not presently used to calculate the gradients during model training itself. Therefore, the parameters of the selected machine learning model are not optimized against an expert heuristic, such as the laboriousness of reviewing file length. Moreover, all current approaches to software defect prediction fail to take into account domain knowledge and business expertise considerations when building and training these machine learning models for software defect prediction.

Accordingly, the inventors of the present invention have developed a new cost function that takes into account not only the performance of the machine learning model, but also domain knowledge of a software team or other developer to optimize the predicted values. Embodiments of the present invention add this domain knowledge to cost functions used to tune model parameters, thereby optimizing predicted files to each team. To achieve this, a penalty based on human input (e.g., from a software development team) is introduced. This penalty can be applied to the cost function to calculate the cost function parameters during a machine learning phase.

Furthermore, embodiments of the present invention offer several advantages over current methods that only apply domain knowledge to pre-train a model with a cost function for a neural network and, only after that, train the actual model on a traditional cost function. Embodiments of the present invention consider human domain knowledge as a factor in a cost function during parameter calculation. As such, embodiments of the present invention permit any cost function to take into account domain knowledge by forming a linear combination of the cost function and a human domain knowledge penalty. This combination can be leveraged to improve any machine learning model, which in turn results in better prediction results. For example, a cost function containing the domain knowledge penalty of the present invention can be integrated into IBM DevOps Insights to replace the default cost function currently in use, thereby better leveraging a user's knowledge about a particular domain and further improving the machine learning models of IBM DevOps Insights.

Figure 2:
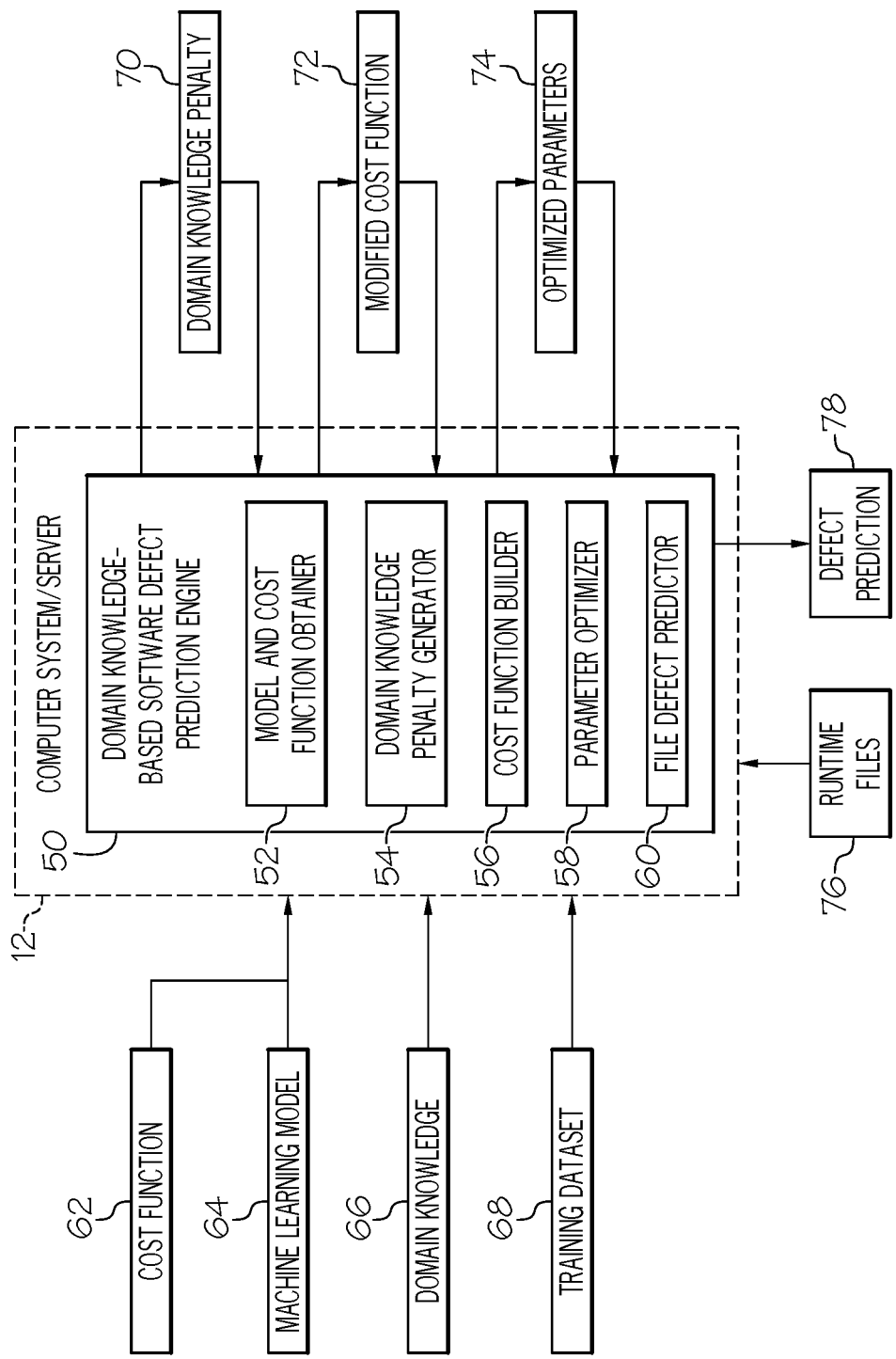
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have a domain knowledge-based software defect prediction engine 50 (hereinafter "system 50"). Rather, all or part of system 50 could be loaded on a server or server-capable device that communicates (e.g., wirelessly) with the clients to provide for domain knowledge-based software defect prediction. Regardless, as depicted, system 50 is shown within computer system/server 12. In general, system 50 can be implemented as program/utility 40 on computer system 12 of FIG. 1 and can enable the functions recited herein.

Along these lines, system 50 may perform multiple functions similar to a general-purpose computer. Specifically, among other functions, system 50 can predict software defects with domain knowledge in a networked computing environment. To accomplish this, system 50 can include a set of components (e.g., program modules 42 of FIG. 1) for carrying out embodiments of the present invention. These components can include, but are not limited to, model and cost function obtainer 52, domain knowledge penalty generator 54, cost function builder 56, parameter optimizer 58, and file defect predictor 60.

Referring now to FIG. 3 in addition to FIG. 2, an illustrative example of a set of equations for training a machine learning model to predict a defect in a software version are shown. Model and cost function obtainer 52, as performed by computer system/server 12, can obtain cost function 62 configured to train machine learning model 64 to predict a defect in a software version. Obtainer 52 can obtain, and system 50 can subsequently leverage, any arbitrary parametric machine learning model 64 with some finite set of parameters for the performance of the defect prediction task. In the illustrative example, for the given finite set of parameters the notation $\hat{y}(\beta)$ can be used to denote the probability of a commit and/or file with the features x being defective (y=1) for machine learning model 64.

Cost function 62, denoted in the illustrative example as $M(y,\hat{y}(\beta))$, can be used to evaluate how well a parametric machine learning algorithm/model 64 performs. As a non-limiting example, in some embodiments, obtainer 52 can select or receive the cross-entropy cost function, denoted as Equation 1 in FIG. 3, as cost function 62. In this example, Equation 1 will indicate that the cross-entropy cost will be zero (0) if the probability to predict the correct class is one (1) and that the cross-entropy cost will go to infinity as the probability to predict the correct class goes to zero (0). It should be understood that embodiments of the present invention are not limited to using the cross-entropy cost function as cost function 62 and that any appropriate cost function could be used to evaluate parametric machine learning model 64.

Domain knowledge penalty generator 54, as performed by computer system/server 12, can determine domain knowledge penalty metric 70 for a team associated with the software version. Although cost function 62 can be used to evaluate how parametric machine learning model 64 learns from training data 68, traditional cost function 62—$M(y,\hat{y}(\beta))$—itself may not behave cognitively and responsively to the task of defect prediction. This is because traditional cost function 62, and by extension parametric machine learning model 64, fails to take into account additional facts based on domain knowledge 66 during the machine learning phase. Instead, currently the feature engineering/reduction process is performed only during the data preparation/cleaning phase, with no domain knowledge 66 being taken into consideration after that. Furthermore, currently during the machine learning phase, traditional cost function 62 awards each false negative or false positive the same weight penalization.

Domain knowledge penalty generator 54, however, can receive domain knowledge 66, for example from a software engineering team associated with a software version on which defect prediction is to be performed. Generator 54 can further generate domain knowledge penalty 70 for certain features based on this human domain knowledge 66. As will be discussed in detail further below, this domain knowledge penalty 70 can be added to cost function 62 to form modified cost function 72 during calculation of the parameters 74 of machine learning model 64, thereby optimizing the accuracy of prediction of machine learning model 64. Furthermore, domain knowledge penalty 70, generated from human domain knowledge 66 by generator 54, can transform traditional cost function 64 into a weighted, modified cost function 74, where particular features are weighted and penalized more heavily to reflect a real-world defect cost.

Domain knowledge penalty generator 54 can use any human domain knowledge 66 to generate domain knowledge penalty 70. Furthermore, domain knowledge penalty generator 54 can tailor domain knowledge penalty 70 to a particular software engineering team or other software review team based on the specific human domain knowledge 66 that the team provides to domain knowledge penalty generator 54. The purpose of human domain knowledge 66 is to permit information that is known to a development team, such as that particular team's perspective on that which is important as to cost, to be incorporated into machine learning model 64. For example, some teams of developers may wish to optimize for time (or cost effectiveness or generated revenue, etc.), including code review time. However, unmodified machine learning models 64 tend to indicate that software files that are the most difficult to review (e.g., long in length) have the greatest probability of containing an error (due, for instance, to the long length). Therefore, in order to optimize time, the development team may wish to ensure that it is very likely that there is truly an error in a longer file before tasking a developer with reviewing it. In another example, a team of developers may know that a particular section of code is extremely sensitive or critical and therefore may wish to ensure that those portions of code receive review. Domain knowledge penalty 70 developed by domain knowledge penalty generator 54 permits these development teams to effectively push machine learning model 64 towards such outcomes via modified cost function 72. Accordingly, domain knowledge penalty 70 can be used to drive up or down the probability outputted by machine learning model 64, causing a file to be considered defective or not defective, even if training dataset 68 would have caused the opposite to be indicated.

Some non-limiting examples of factors forming domain knowledge penalty 70 are as follows:

(1) The number of editors of a file: A development team may indicate that a file with more developers has a larger pool of reviewers, and is thus less constrained when optimizing for reviewer time. Therefore, domain knowledge penalty generator 54 can configure domain knowledge penalty 70 to penalize files with fewer developers.

(2) The number of lines changed in a file's change set: A development team may indicate that the number of lines changed in a file indicates the cognitive load of a potential review, where more lines lead to longer review times. Therefore, domain knowledge penalty generator 54 can configure domain knowledge penalty 70 to penalize files with a larger number of lines changed.

(3) The number of files in a change set: A development team may indicate that the number of files in a file's change set may indicate a complex change with many dependencies, which would increase cognitive load of potential code review. Therefore, domain knowledge penalty generator 54 can configure domain knowledge penalty 70 to penalize files in change sets with a large number of files.

Following the examples given above, in some embodiments, domain knowledge penalty 70 can be written as: domain knowledge penalty=number of editors cost+number of lines changed cost+number of files cost. It should be understood that these example costs forming domain knowledge penalty 70 are not intended to be limiting. Domain knowledge penalty 70 can include any other domain knowledge-based costs presently known or later discovered.

In some embodiments of the present invention, domain knowledge penalty generator 54 can calculate domain knowledge penalty 70 by testing various weights for each cost penalty against a ground truth. To accomplish this, domain knowledge penalty generator 54 can start this process by initializing a weight for each cost penalty 70 at a randomly selected number. Generator 54 further assumes a ground truth or ground state for each cost penalty 70 based on a real data set, where the existence of a specific set of defects is pre-known. Generator 54 can be configured to enter data from the real dataset into model 64 to generate defect prediction outputs form the model. These defect prediction outputs can be compared to the predefined ground truths (i.e., the actual existence of a defect or not). Generator 54 can adjust/update the weights for each cost penalty until the defect prediction outputs reflect those desired by the software development team.

Cost function builder 56, as performed by computer system/server 12, can applying a linear combination of domain knowledge penalty metric 70 to cost function 62 to create domain knowledge-modified cost function 72. Accordingly, cost function builder 56 optimizes cost function 62 by inserting domain knowledge penalty metric 70 into it. Following the above listed examples of factors forming domain knowledge penalty 70, in some embodiments, this optimized cost function 72 can be written as: cost=prediction error cost+number of editors cost+number of lines changed cost+number of files cost, wherein prediction error cost is the cost expressed by unmodified cost function 62. It should again be understood that in this example, the costs forming domain knowledge penalty 70 are not intended to be limiting. Domain knowledge-modified cost function 72 can include a linear combination of any other domain knowledge-based costs presently known or later discovered. Modified cost function 72 can be used by system 50 to optimize the parameters of machine learning model 64 while simultaneously optimizing the parameters for domain knowledge 66 provided by a software development team or other software review team.

Parameter optimizer 58, as performed by computer system/server 12, can train machine learning model 58 based on domain knowledge-modified cost function 72. This training permits parameter optimizer 58 to find optimized parameters 74 for parametric machine learning model 64 that not only best fit training dataset 68, but that also reflect outcomes desired by the software development team in light of the domain knowledge possessed by the team. As domain knowledge penalty 70 affects the weight of domain knowledge-modified cost function 72, parameter optimizer 58 can find optimized parameters 74 that make parametric machine learning model 64 more generalized. This improves the quality of model 64 within the limits of training dataset 68.

According to some embodiments of the present invention, domain knowledge-modified cost function 72 used to calculate the human learned cost and optimize parameters 74 ($\beta$) of machine learning model 64 can be (1) fully known, or (2) fully known except for a finite number of parameters $\alpha$. Examples of each of these cases will be discussed below.

Referring again to FIG. 3, in addition to FIG. 2, and continuing the example discussed above, when the cost function is fully known, parameter optimizer 58 can define the modified cost function 72, denoted as $MH(y,\hat{y}(\beta))$ and also called the objective function herein, as Equation 2 of FIG. 3. In Equation 2, $H_j$ is the fully known modified cost function 72 for input $p_j$, which may appear in parametric machine learning model 64 or may not. Further, in Equation 2, m is the number of types of human domain knowledge penalizations (e.g., number of editors, number of lines changed, number of files) added to cost function 62 to create modified cost function 72. Given Equation 2, parameter optimizer 58 is configured to find parameters 74 ($\beta$) that give the minimum possible cost using a gradient descent technique. Any gradient descent technique now known or later developed can be used to find optimized parameters 74. For example, in some embodiments, the following gradient decent technique is used.

Step 1. Parameter optimizer 58 generates initial values of say, from a sample of N(0,1) variables.

Step 2. Parameter optimizer 58 minimizes the objective function $MH(y,\hat{y}(\beta))$ (modified cost function 72) with respect to $\beta$ by gradient descent with all other parameters fixed. Therefore, parameter optimizer 58 updates $\beta$ by the rule expressed in Equation 3 of FIG. 3, with the learning rate $\gamma$.

Step 3. Parameter optimizer 58 repeats step 2 until the objective function $MH(y,\hat{y}(\beta))$ (modified cost function 72) stabilizes, yielding optimized parameters 74.

Referring now to FIG. 4, in addition to FIG. 2, alternatively, in the case the cost function is fully known except for a finite number of parameters $\alpha$, parameter optimizer 58 can define the modified cost function 72, denoted as $MH(y,\hat{y}(\beta),\alpha)$ and also called the objective function herein, as Equation 4 of FIG. 4. In Equation 4, $H_j$ is modified cost function 72 for input $p_j$ with parameters $\alpha_j$, which may appear in parametric machine learning model 64 or may not. Further, in Equation 4, m is the number of types of human domain knowledge penalizations (e.g., number of editors, number of lines changed, number of files) added to cost function 62 to create modified cost function 72. Given Equation 4, parameter optimizer 58 is configured to find parameters $\alpha$ and optimized parameters 74 ($\beta$) that give the minimum possible cost using a gradient descent technique. Any gradient descent technique now known or later developed can be used to find optimized parameters 74 and parameters $\alpha$. However, modified cost function 72 for parameters $\alpha$ and $\beta$ may not be convex, making the global minimum difficult to find. Accordingly, in some embodiments of the present invention, the following alternating gradient descent technique is used.

Step 1. Parameter optimizer 58 generates initial values of α and β, say, from a sample of N(0,1) variables.

Step 2. Parameter optimizer 58 minimizes the objective function $MH(y,\hat{y}(\beta), \alpha)$ (modified cost function 72) with respect to α by gradient descent with all other parameters fixed. Therefore, parameter optimizer 58 updates α by the rule expressed in Equation 5 of FIG. 4, with the learning rate γ.

Step 3. Parameter optimizer 58 minimizes the objective function $MH(y,\hat{y}(\beta), \alpha)$ (modified cost function 72) with respect to β by gradient descent with all other parameters fixed. Therefore, parameter optimizer 58 updates β by the rule expressed in Equation 6 of FIG. 4, with the learning rate γ.

Step 4. Parameter optimizer 58 repeats steps 2 and 3 until the objective function $MH(y,\hat{y}(\beta), \alpha)$ stabilizes, yielding optimized parameters α and optimized parameters 74.

File defect predictor 60, as performed by computer system/server 12, can report a set of predicted values 78 based on the domain knowledge-modified cost function 72 trained machine learning model 64. Once optimized parameters 74 have been determined, file defect predictor 60 can apply machine learning model 64 to runtime files 76. Runtime files can include, but are not limited to, any file containing a portion of code developed by the software development team for a version of software. File defect predictor 60 uses parametric machine learning model 64 to output defect prediction 78. File defect predictor 60 provides a finding indicating a probability that input file 76 is defective and therefore in need of review. In some embodiments, file defect predictor 60 can also provide a rational for the outputted defect prediction. This rational can be based on, for example, which domain knowledge penalties 70 carried the most weight for that particular input file 76. This permits a software development team to identify sources of defects in software code and remove those defects before the code is entered into production.

Figure 5:
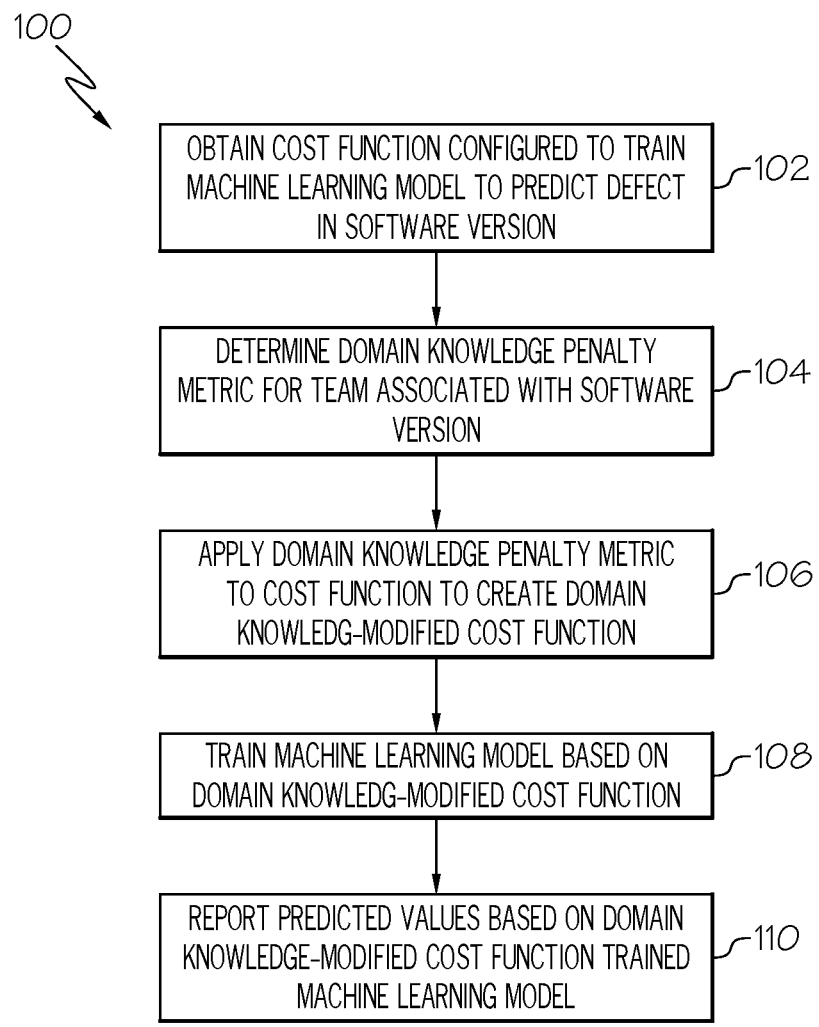
FIG. 5 shows a process flowchart for domain knowledge-based software defect prediction according to illustrative embodiments.

As depicted in FIG. 5, in one embodiment, a system (e.g., computer system/server 12) carries out the methodologies disclosed herein. Shown is a process flowchart 100 for domain knowledge-based software defect prediction. At 102, model and cost function obtainer 52 obtains a cost function 62 configured to train a machine learning model 64 to predict a defect in a software version. At 104, domain knowledge penalty generator 54 determines a domain knowledge penalty metric 70 for a team associated with the software version. At 106, cost function builder 56 applies a linear combination of the domain knowledge penalty metric 70 to the cost function 62 to create a domain knowledge-modified cost function 72. At 108, parameter optimizer 58 trains the machine learning model 64 based on the domain knowledge-modified cost function 72. At 110, file defect predictor 60 reports a set of predicted values 78 based on the domain knowledge-modified cost function 72 trained machine learning model 64.

Process flowchart 100 of FIG. 5 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for domain knowledge-based software defect prediction. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for domain knowledge-based software defect prediction. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to predict software defects with domain knowledge. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for domain knowledge-based software defect prediction, the method comprising:
    obtaining a cost function configured to train a machine learning model to predict a defect in a software version;
    determining a domain knowledge penalty metric for a team associated with the software version;
    applying a linear combination of the domain knowledge penalty metric to the cost function to create a domain knowledge-modified cost function;
    training the machine learning model based on the domain knowledge-modified cost function; and
    reporting a set of predicted values based on the domain knowledge-modified cost function trained machine learning model.

2. The method of claim 1, wherein the obtained cost function is a cross-entropy cost function defined as:

$$M_{ce}(y,\hat{y}(\beta))=-\Sigma_{i=1}^{n}[y_i \log(\hat{y}_i(\beta))+(1-y_i)\log(1-\hat{y}_i(\beta))],$$

wherein $\beta$ is a finite set of parameter and $\hat{y}(\beta)$ is a probability of a file with features x being defective where (y=1).

3. The method of claim 1, wherein the domain knowledge penalty metric comprises at least one feature selected from the group consisting of: a number of editors of the software version, a number of lines changed in a change set for the software version; and a number of files in a change set for the software version.

4. The method of claim 1, the method further comprising optimizing the domain knowledge penalty metric for an outcome defined by the team.

5. The method of claim 1, the training the machine learning model further comprising optimizing parameters of the machine learning model by determining values of the parameters at which the domain knowledge-modified cost function is minimized.

6. The method of claim 5, wherein a gradient descent technique is applied to the domain knowledge-modified cost function to minimize the domain knowledge-modified cost function.

7. The method of claim 1, the reporting a set of predicted values further comprising:
    receiving a software code file associated with the software version;
    inputting the software code file into the trained machine learning model; and
    predicting a probability that the software code file contains a defect from an output of the trained machine learning model.

8. A computer system for domain knowledge-based software defect prediction, the computer system comprising:
    a memory medium comprising program instructions;
    a bus coupled to the memory medium; and
    a processor, for executing the program instructions, coupled to a domain knowledge-based software defect prediction engine via the bus that when executing the program instructions causes the system to:
        obtain a cost function configured to train a machine learning model to predict a defect in a software version;
        determine a domain knowledge penalty metric for a team associated with the software version;
        apply a linear combination of the domain knowledge penalty metric to the cost function to create a domain knowledge-modified cost function;
        train the machine learning model based on the domain knowledge-modified cost function; and
        report a set of predicted values based on the domain knowledge-modified cost function trained machine learning model.

9. The computer system of claim 8, wherein the obtained cost function is a cross-entropy cost function defined as:

$$M_{ce}(y,\hat{y}(\beta))=-\Sigma_{i=1}^{n}[y_i \log(\hat{y}_i(\beta))+(1-y_i)\log(1-\hat{y}_i(\beta))],$$

wherein $\beta$ is a finite set of parameter and $\hat{y}(\beta)$ is a probability of a file with features x being defective where (y=1).

10. The computer system of claim 8, wherein the domain knowledge penalty metric comprises at least one feature selected from the group consisting of: a number of editors of the software version, a number of lines changed in a change set for the software version; and a number of files in a change set for the software version.

11. The computer system of claim 8, the instructions further causing the system to optimize the domain knowledge penalty metric for an outcome defined by the team.

12. The computer system of claim 8, the instructions further causing the system to optimize parameters of the machine learning model by determining values of the parameters at which the domain knowledge-modified cost function is minimized.

13. The computer system of claim 12, wherein a gradient descent technique is applied to the domain knowledge-modified cost function to minimize the domain knowledge-modified cost function.

14. The computer system of claim 8, the instructions further causing the system to:
- receive a software code file associated with the software version;
- input the software code file into the trained machine learning model; and
- predict a probability that the software code file contains a defect from an output of the trained machine learning model.

15. A computer program product for domain knowledge-based software defect prediction, the computer program product comprising a computer readable hardware storage device, and program instructions stored on the computer readable hardware storage device, to:
- obtain a cost function configured to train a machine learning model to predict a defect in a software version;
- determine a domain knowledge penalty metric for a team associated with the software version;
- apply a linear combination of the domain knowledge penalty metric to the cost function to create a domain knowledge-modified cost function;
- train the machine learning model based on the domain knowledge-modified cost function; and
- report a set of predicted values based on the domain knowledge-modified cost function trained machine learning model.

16. The computer program product of claim 15, wherein the obtained cost function is a cross-entropy cost function defined as:

$$M_{ce}(y,\hat{y}(\beta)) = -\Sigma_{i=1}^{n}[y_i \log(\hat{y}_i(\beta)) + (1-y_i)\log(1-\hat{y}_i(\beta))],$$

wherein $\beta$ is a finite set of parameter and $\hat{y}(\beta)$ is a probability of a file with features x being defective where (y=1).

17. The computer program product of claim 15, wherein the domain knowledge penalty metric comprises at least one feature selected from the group consisting of: a number of editors of the software version, a number of lines changed in a change set for the software version; and a number of files in a change set for the software version.

18. The computer program product of claim 15, the computer readable storage device further comprising instructions to optimize the domain knowledge penalty metric for an outcome defined by the team.

19. The computer program product of claim 15, the computer readable storage device further comprising instructions to optimize parameters of the machine learning model by determining values of the parameters at which the domain knowledge-modified cost function is minimized, wherein a gradient descent technique is applied to the domain knowledge-modified cost function to minimize the domain knowledge-modified cost function.

20. The computer program product of claim 15, the computer readable storage device further comprising instructions to:
- receive a software code file associated with the software version;
- input the software code file into the trained machine learning model; and
- predict a probability that the software code file contains a defect from an output of the trained machine learning model.

* * * * *